United States Patent [19]
Zhang et al.

[11] Patent Number: 5,657,124
[45] Date of Patent: Aug. 12, 1997

[54] METHOD OF MEASURING THE THICKNESS OF A TRANSPARENT MATERIAL

[75] Inventors: Jingwei Zhang, Antony; Pascal Grente, Courbevoie, both of France

[73] Assignee: Saint Gobain Cinematique et Controle, Gennevilliers, France

[21] Appl. No.: 530,378
[22] PCT Filed: Feb. 17, 1995
[86] PCT No.: PCT/FR95/00184
 § 371 Date: Dec. 15, 1995
 § 102(e) Date: Dec. 15, 1995
[87] PCT Pub. No.: WO95/22740
 PCT Pub. Date: Aug. 24, 1995

[30] Foreign Application Priority Data

Feb. 18, 1994 [FR] France ................................ 94 01846

[51] Int. Cl.$^6$ ........................................ G01B 9/02
[52] U.S. Cl. .................. 356/355; 356/349; 356/357
[58] Field of Search .......................... 356/345, 349, 356/355, 357

[56] References Cited

U.S. PATENT DOCUMENTS 5,402,230 3/1995 Tian et al. .............................. 356/349

*Primary Examiner*—Frank G. Font
*Assistant Examiner*—Robert Kim
*Attorney, Agent, or Firm*—Oblon, Spivak, McClelland, Maier & Neustadt, P.C.

[57] ABSTRACT

A method and apparatus for measuring the thickness of a transparent material. A light beam from a laser diode has a modulated optical frequency. The emitted light shines on opposite surfaces of a wall of the material and is reflected from both of the surfaces. The two beams are used to form an interference. The difference of step δ of the interference signal is then determined. The thickness of the transparent material is determined from this difference of step. The apparatus may be used with bottles of glass or plastic material, whether clear or colored and on flat glass.

17 Claims, 4 Drawing Sheets

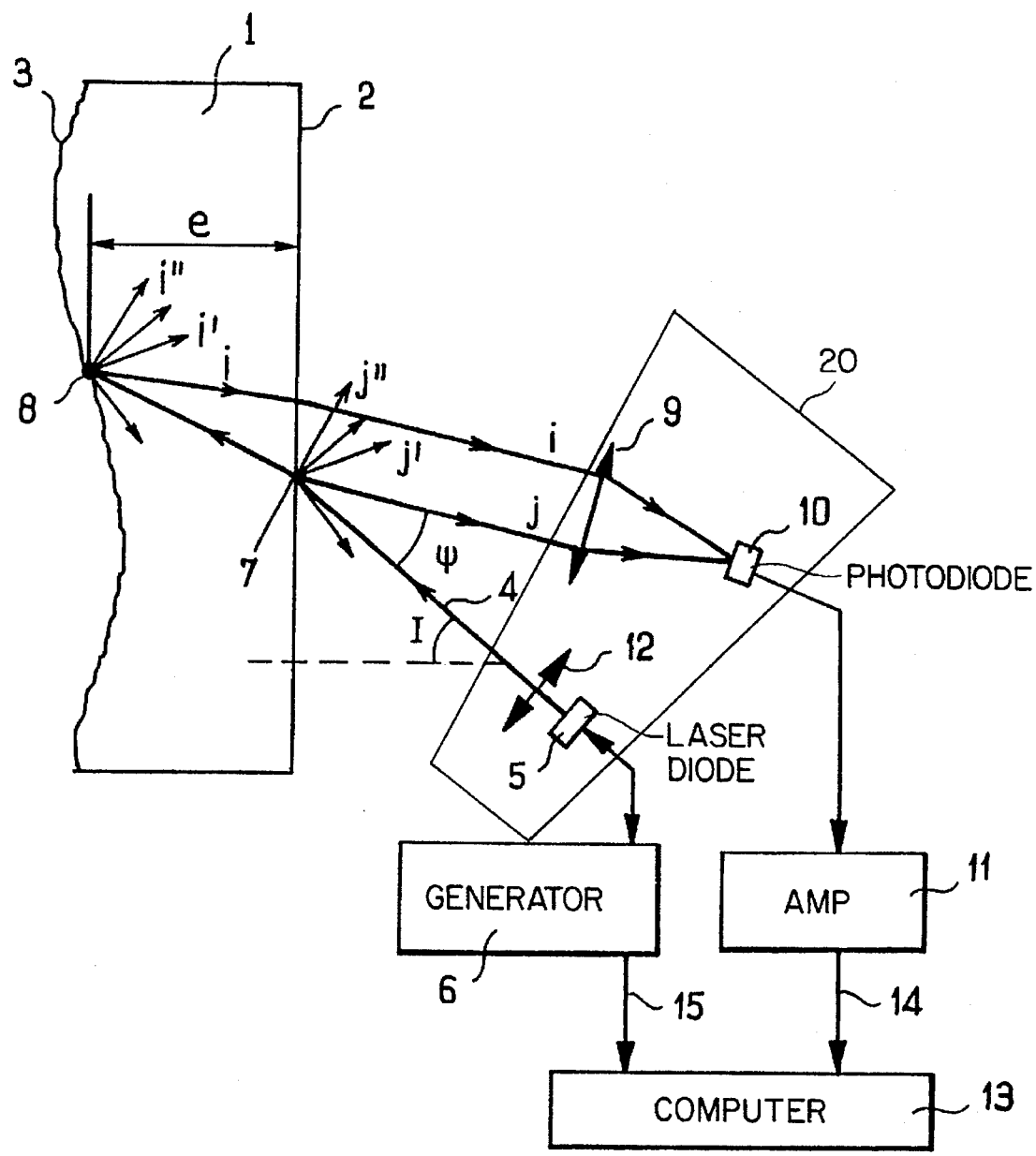
FIG_1

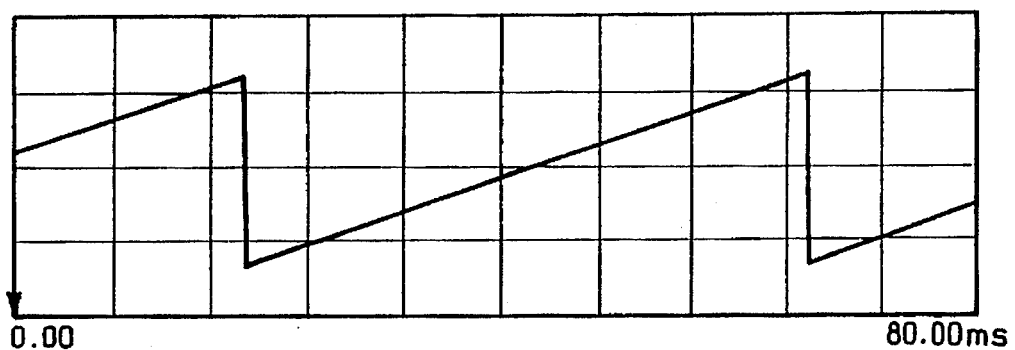
FIG_2
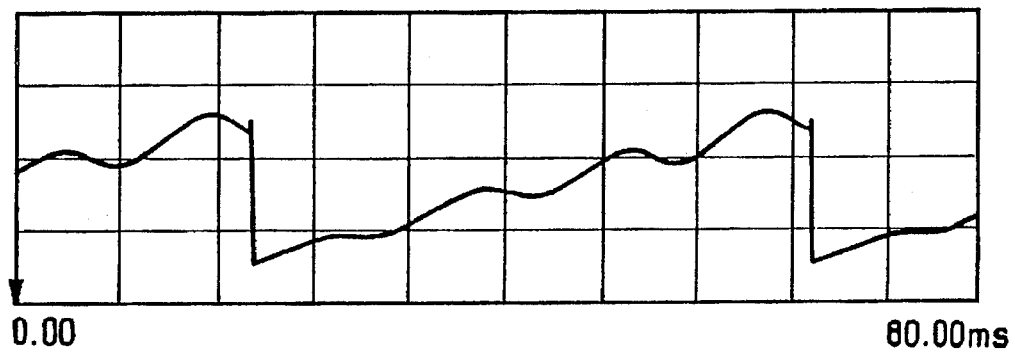
FIG_3

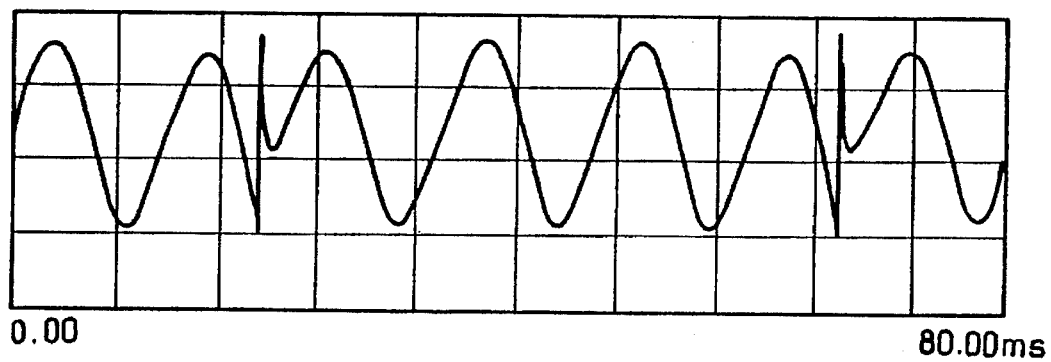
FIG._4
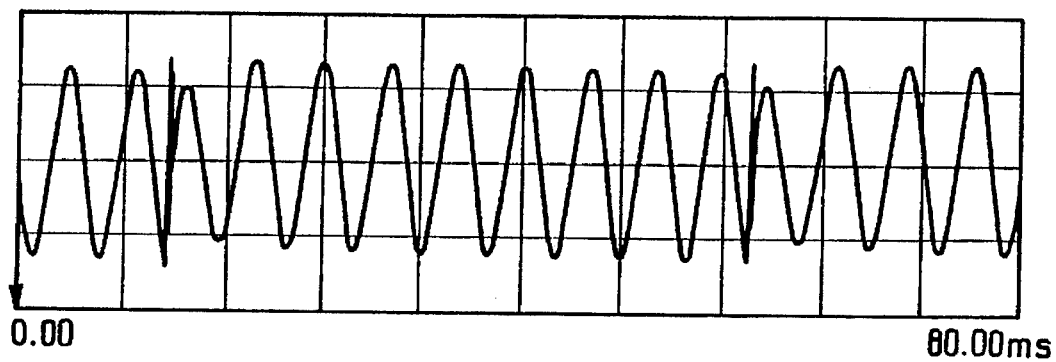
FIG._5

METHOD OF MEASURING THE THICKNESS OF A TRANSPARENT MATERIAL

BACKGROUND OF THE INVENTION

1. Field of the Invention:

This invention concerns a method and a device for measuring the thickness of transparent materials. More especially, but not exclusively, the invention is aimed at measuring the thickness of materials of glass and, more specifically, measuring the thickness of glass containers, such as bottles or flasks.

2. Discussion of the Background:

The general quality requirements demanded by clients and the reduction in weight of bottles require a very rigorous control of the thickness of these bottles.

In the glassmaking industry it is usual, for obtaining thickness measurements, to use the measurement of electrical capacitance as a base. In effect, since glass is a dielectric material, measurement of the capacitance of the glass by means of electrodes enables the thickness of the glass to be locally determined.

Such a technique is described, notably, in Patents EP 300 616 and EP 363 114. It consists of applying a pick-up, in the form of an elongate electrode, onto a bottle while the bottle revolves about its axis.

Such a technique has the disadvantage of requiring the pick-up to be held against the wall of the bottle. This inevitably leads to rapid wear of the pick-up, amplified by the rotation of the bottle. The pick-up may also be entirely destroyed if the bottle has a large defect which strikes the pick-up.

Another technique is described in the French Patent published under number 2 129 416. This technique consists of establishing a high-frequency electro-magnetic field and measuring the variation in intensity of this field caused by the introduction of a dielectric material. The voltage induced in the probe gives an indication of the variation in intensity of the field and is proportional to the thickness of the dielectric material.

This technique does not, however, lead to high accuracy in measurements of thicknesses. It is more especially used for determining thicknesses below a threshold value without, however, giving an exact measurement.

Furthermore, it also requires contact with the bottle, which can result in premature wear of the measuring head, as has been described for the preceding technique.

This premature wear or accidental destructions therefore require a frequent replacement of the detectors or measuring heads and lead to high costs of maintenance of the control system.

Moreover, each deterioration and/or replacement of a pick-up or measuring head may necessitate a rechecking of a series of articles which has been inadequately checked and an interruption to production during the pause in the control, which therefore results in reduced output.

SUMMARY OF THE INVENTION

A first objective of this invention is to find a method of measuring thickness of a transparent material, notably an article of glass, which shall give a high accuracy of the measurements.

A second objective is to avoid the risk of premature wear or destruction of the measuring tools, notably during friction of the articles being measured on these tools.

Another objective of the invention is to adapt the method of measurement to the measuring of thicknesses of articles in continuous movement, over the entire article.

The inventors have considered a transparent material to be assimilable to an interferometer; the light incident perpendicularly upon such a material is reflected by both faces of the material. The two reflected rays interfere with a difference of step, denoted $\delta$, which is expressed as follows:

$$\delta = 2n \cdot e \quad (1)$$

where n and e represent, respectively, the refractive index and the thickness of the transparent material.

Furthermore, the principles of optical interferometry, when the light source is monochromatic, lead to an interference signal received by the photo-detector which can be expressed as follows:

$$S_{int} = I_0 \left( 1 + K \cdot \cos\left( \frac{2\pi}{\lambda} \delta \right) \right) \quad (2)$$

where $I_0$ and $\lambda$ represent, respectively, the light intensity and the wavelength of the monochromatic source and K denotes the interference contrast.

By determining the difference of step, it is then easy to determine the thickness of the transparent material. However, a limit appears for the application of this method linked to the periodicity of the interference signal as a function of the difference of step. In fact, since the difference of step is determined from phase measurement, there is a problem of ambiguity. For determining the difference of step, a phase smaller than $\pi$ it is necessary, and therefore a difference of step smaller than one-half of the wavelength. This leads to very accurate measurements of thickness which are, however, limited to materials having a thickness less than one micron.

This disadvantage, linked to the limit of such a measurement technique, is resolved according to this invention, which proposes a method of measuring the thickness of a transparent or semitransparent material, consisting of emitting a light beam with modulated optical frequency and then receiving two beams or light rays, with advantage parallel, returned by each of the surfaces of a wall face of the material, of creating an interference between them and of determining the difference of step of the interference signal.

The difference of step is advantageously deduced from the number of beats of the interference signal per modulation period.

The light beam or pencil is advantageously emitted by a laser diode. In the case of a material having parallel surfaces, a parallel beam is used and, in the case of material having non-parallel faces, the beam is advantageously focused onto the wall face of the material.

The method of measurement is thus suitable for the measurement of transparent substrates, the thickness of which is preferably greater than 0.1 millimetre.

In fact, the method thus enables the thickness of said substrate to be measured by ignoring the thickness of a film or a surface coating such as that of a lubricant deposited on the surface of a bottle. In this way any risk of perturbation is avoided.

Advantageously, the optical frequency of the beam emitted is modulated by modulating the supply current to the laser diode.

Preferably, a linear modulation of the optical frequency of the light beam is created.

According to one preferred mode of the invention, the reciprocal of the wavelength $1/\lambda$ is linearly modulated. This results in a modulation of the optical frequency which can be expressed as $\omega_0 = c/\lambda$, where c is the velocity of light. By analogy, $1/\lambda$ can be thought of as the optical frequency. This frequency, during a linear modulation, is expressed by the equation:

$$\frac{1}{\lambda} = \frac{1}{\lambda_0} + \frac{\Delta\lambda}{\lambda_0^2} \cdot \frac{t}{T} \tag{3}$$

where $\Delta\lambda$ and T represent, respectively, the variation in wavelength without mode jump and the period of modulation. t denotes the time.

At an instant t of the detection, the detector receives, simultaneously, two rays transmitted from two faces of the glass.

Since these two rays have a time delay the one relative to the other by reason of the difference of step existing between them, they possess different optical frequencies.

The interference signal can then be expressed as follows:

$$V_{int} = I_0 (1 + K \cdot \cos(\phi_0 + \omega t)) \tag{4}$$

$$\phi_0 = \frac{2\pi}{\lambda_0} \delta \tag{5}$$

$$\omega = 2\pi \left( \frac{\Delta\lambda}{\lambda_0^2} \right) \cdot \frac{\delta}{T} \tag{6}$$

where $I_0$ and $\lambda_0$ represent, respectively, the light intensity and the wave-length of the monochromatic source in the absence and $\delta$ is the difference of step. K denotes the interference contrast.

Expression (4) shows that a linear modulation of the optical frequency of the light source results in a cosinusoidal interference signal having the pulsation $\omega \cdot \omega/2\pi$ is the difference in optical frequency between two rays that interfere. In this case, the detection is both coherent and heterodyne: it is coherent because the effective signal is the interference term of two rays; it is also heterodyne because what is detected is a difference in optical frequency of these two rays.

In a variant, the invention proposes a sinusoidal modulation of the optical frequency of the light beam.

The number of beats N during a modulation period T corresponds to the ratio of the pulsation $\omega$ to the modulation pulsation and therefore is expressed as:

$$N = \frac{\Delta\lambda}{\lambda_0^2} \cdot \delta \tag{7}$$

This ratio and the determination of the number of beats N lead to the difference in step by equation (7) and to the thickness of the material "e" by equation (1).

This method therefore enables the thickness "e" of a transparent material to be determined and leads to good accuracy of measurement, which confirms that such a material is assimilable to an interferometer. Furthermore, since the method of this invention is based upon the emission of a light signal and the reception of signals returned by the material, it can be carried out by the use of emission and reception tools installed at a non-zero distance from the material. The method thus described therefore enables a thickness "e" to be measured without contact between the transparent material and the measuring tools and therefore without risk that these tools might be subject to premature wear due, for example, to friction of the objects.

This method may be used for measuring sheet glass which has two parallel faces. In contrast, in other applications and notably for measuring the thickness of packages or containers of glass such as flasks, the results obtained are not always satisfactory.

It has been found that the refractive quality of the inner face of the wall of a flask or bottle is bad on account of the production techniques and, moreover, in general is not parallel to the outer face. The reflection obtained from this face is therefore random.

For the purpose of adapting the measuring process to this type of material and, notably, to glass receptacles, the invention proposes according to one advantageous form of embodiment to pick up, from among the diffuse rays emitted by each of the faces of a wall, two rays parallel to each other and to create an interference between these rays. For picking up the diffuse rays and their interference, it is preferably to focus the incident beam on the wall of the receptacle.

Although it is commonly accepted that glass is a material that is scarcely or virtually not at all diffusive, it is apparent that this variant of the invention results in exact measurements with high accuracy.

The diffused rays picked up are preferably chosen along a direction other than that of the beam reflected by the surfaces of the wall of the transparent material.

Equation (1) associating the difference of step with the thickness is therefore different and can be expressed:

$$\delta = e \left[ n \left( \frac{1}{\cos\alpha} + \frac{1}{\cos\beta} \right) - (\tan\alpha + \tan\beta)\sin(\psi - I) \right] \tag{1'}$$

where:

$$\alpha = \sin^{-1}\left( \frac{1}{n} \sin I \right)$$

$$\beta = \sin^{-1}\left( \frac{1}{n} \sin(\psi - I) \right)$$

and I=angle of incidence $\psi$=system angle, that is to say the angle formed by the incident beam and the measured diffused rays.

The thickness "e" of the transparent material may be determined from this equation (1') and from equation (7) after the number of beats N per modulation period has been determined. It is important to note that the thickness remains a value proportional to the number of beats.

In the measurement of thickness of bottles, the bottles are in rotation about their axes. It has now been found that this rotation can cause a variation in the luminous intensity of the rays returned by the surfaces of the wall. This variation in intensity may, notably, be due to the presence of dust or stains or irregularities of the material on the external or internal surface.

This variation is therefore a function of time.

This variation will therefore perturb the interference signal ($V_{int}$) and consequently the determination of the number of beats N or the difference of step $\delta$ becomes difficult.

To overcome this problem, the invention proposes, in one variant, to obtain the quotient ($V_{int}/V_{mod}$), where ($V_{mod}$) designates the signal of the light intensity of the rays emitted from the surfaces of the wall of the transparent material. It is then possible to determine the difference of step $\delta$ of the interference signal ($V_{int}$) notably from the number of beats N per modulation period.

The invention proposes also a device for carrying out the method described above.

This device comprises, on the one hand, a monochromatic light source of modulated optical frequency, which is advantageously a laser diode associated with a focusing lens and, on the other hand, means for receiving an interference signal and a computer for determining the number of beats of the interference signal per modulation period.

Preferably, the laser diode is supplied from a generator providing a linearly modulated current.

In the case, notably, of the measurement of the thickness of glass containers which requires the treatment of diffused rays, the reception means are a lens and an avalanche photodiode placed at the focus of the lens.

Preferably again, the light source and the reception means are housed in a single housing or pick-up and during the measurements this is positioned in such a way that the emitted beam forms an angle other than 90° with the outer surface of the container. In this way the beam reflected by the surfaces of the wall cannot harm the interference of two diffusion rays which have a much weaker intensity.

Also for the purpose of improving the interference signal, it is preferable to use an avalanche photodiode such that the ratio of its photosensitive diameter to the focal distance of the lens is small. This assures, in fact, a good interference contrast. In the tests, this ratio was 1/100.

BRIEF DESCRIPTION OF THE DRAWINGS

Other details and advantageous characteristics of the invention will be apparent below from the description of the figures and of the tests carried out according to this invention.

The figures show:

FIG. 1, a schematic representation of a device according to this invention for measuring the thickness of a glass article, FIG. 2, a measurement of the linear modulation of the light intensity ($V_{mod}$) as a function of time, FIG. 3, a measurement of the interference signal ($V_{int}$) as a function of time for a thickness e=1.67 mm, FIG. 4, a representation of the number of beats per modulation period for a thickness e=1.67 mm, FIG. 5, a representation of the number of beats per modulation period for a thickness e=3.85 mm, FIG. 6, a plot of the number of beats per modulation period as a function of the thickness of the material.

Figure 6:
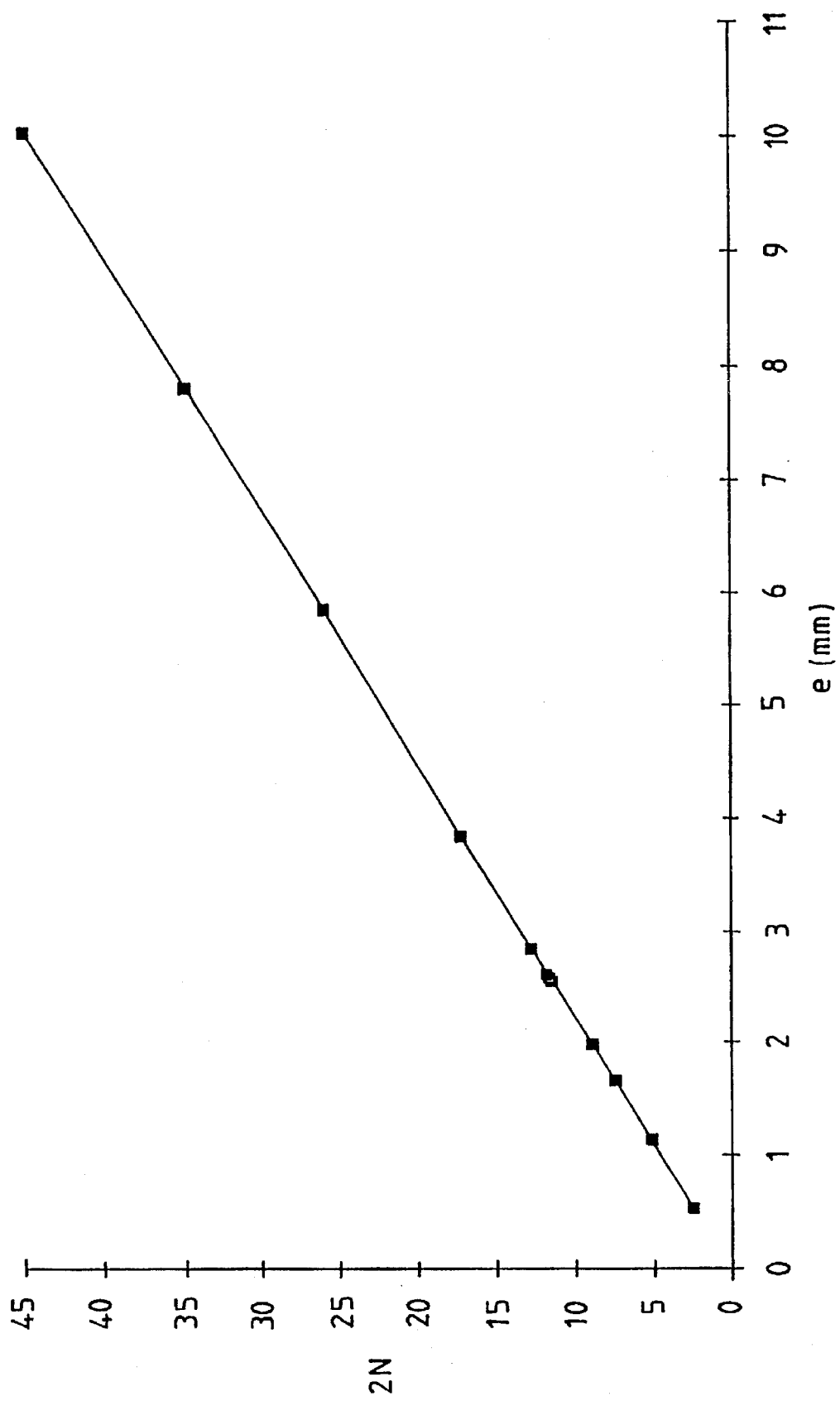

The ordinates of FIGS. 2, 3, 4 and 5 are shown in arbitrary units.

DETAILED DESCRIPTION OF THE PREFERRED EMBODIMENTS

FIG. 1 shows schematically a device according to this invention adapted for measuring the thickness "e" of the wall (1) of a stationary glass bottle. The wall (1) of the bottle is shown schematically in part in this figure.

It comprises an outer surface (2) which is in contact with a mould during its formation and which has an entirely satisfactory refractive quality. The inner surface (3) of the wall, which is in contact with the blown air during its formation, for its part has a bad refractive quality. The defects of this surface have been deliberately amplified in this schematic figure to demonstrate more clearly that the direction of a beam reflected by this surface is entirely random and varies according to the point of incidence on this surface.

The incident beam (4) arriving at the wall is emitted from a laser diode (5) and passes through a lens (12) which focuses it on the wall (1).

The laser diode (5) used in the tests that will be described later is a diode of the longitudinal and transverse monomode type. Its maximum power is 10 mW and its wavelength $\lambda_0$=780 nm.

The laser diode (5) is supplied from a generator (6), the current of which is modulated linearly and periodically. This modulation of the supply current enables the wavelength of the laser diode to be modulated and also modulates its intensity.

Other means enable the wavelength only to be modulated while keeping its intensity constant, but these are much more costly.

The incident beam (4) emitted by the laser diode (5) is focused on the wall (1) and meets a first point of impact (7) on the outer surface (2) and a second point (8) on the inner surface (3). The arrows (i, i', i"...) and (j, j', j"...) show symbolically the diffusion of the glass, which takes place in all directions.

A reception device composed of a lens (9) and of an avalanche photodiode (10) is so positioned as to receive an interference signal from two rays (i, j), diffused by each of the surfaces (2, 3) of the wall (1). Since the diffusion takes place in all directions, it is always possible to receive two parallel diffused rays (i, j) from the points (7) and (8). The avalanche photodiode (10) is situated at the focal distance of the lens (9) to receive the interference signal ($V_{int}$). This avalanche photodiode (10) is associated with an amplifier (11) to give a more easily analyzed signal.

In effect, glass is known to have a weakly diffusing surface. It has, however, been found that the processing of diffused rays according to this invention gives good results. It is, nevertheless, desirable for the reception device to be placed in a direction other than that of the beam reflected by the faces of the wall. If this were not so this beam, which is much more intense than the diffusion rays, would also be received by the avalanche photodiode (10) and would perturb the interference signal ($V_{int}$).

In practice, the laser diode and the avalanche photodiode are placed in a single casing or pick-up, 20. The angle of the system $\psi$ is chosen very small (approximately 5°) and the incidence is chose different from the perpendicular, so that the photodiode cannot be on the path of the beam reflected by the surfaces.

The signal ($V_{int}$) is transmitted to a computer (13), via the connection (14) for the analysis to be carried out.

The signal ($V_{mod}$) representing the variation in the light intensity as a function of time is also transmitted to the computer (13) via the connection (15).

In FIG. 1, the signal ($V_{mod}$) is transmitted from the laser diode via the supply system, because the glass bottle is fixed. In fact, the variation of the light intensity of the incident beam (4) is then proportional to that of the diffused rays (i, j). It would be otherwise if the bottle were given a rotary movement because, as we have seen, this rotation leads to a variation in the intensity with time.

In this latter case to obtain $V_{mod}$, it is possible to measure the light intensity of the rays (i, j) for example by incorporating a semireflective separator cube on the path of the rays (i, j) before they reach the lens (9) and by orientating them onto another photodiode, without an interference of these rays (i, j) being produced.

The type of interference signal ($V_{int}$) obtained with such a device is shown in FIG. 3. Such a signal appears difficult to analyse, the amplitude varying over a modulation period.

FIG. 2 shows a measurement of the linear modulation of the intensity ($V_{mod}$) of the laser diode. To enable the interference signal ($V_{int}$) to be analysed, it is possible to arrange the ratio ($V_{int}/V_{mod}$) as shown in FIG. 4 by means of the computer (13). This signal ($V_{int}/V_{mod}$) enables the number of beats and therefore the thickness "e" of the bottle of glass analysed to be calculated.

We have seen earlier that the analysis of the signal ($V_{int}/V_{mod}$) enables the perturbations resulting from the variation in the intensity during rotation of the bottles to be avoided.

Now in the case of FIG. 1, the bottle has been considered as being stationary.

The signal ($V_{int}/V_{mod}$) is nevertheless interesting in this case, because the type of modulation chosen leads to a variation in the intensity as a function of time ($V_{mod}$) and also perturbs the signal ($V_{int}$) as FIG. 3 shows.

Different tests have been performed on glass samples of known thicknesses for validating the measuring process according to this invention.

FIGS. 3 and 4 relate to a specimen of known thickness e=1.67 millimetres.

FIG. 5 shows the signal ($V_{int}/V_{mod}$) obtained by measuring a specimen for which the thickness e=3.85 millimetres.

These two results and others not shown in the form of FIGS. 4 and 5 are shown in FIG. 6, which is a graph showing the values of beats per modulation period, measured on specimens of given thicknesses.

FIG. 6 shows that this graph forms a straight line passing through the origin. The application of the principles of heterodyne interferometry is therefore confirmed by this graph. In fact, the proportionality relationship between the number of beats per modulation period and the thickness "e" of the material measured is verified. This also confirms the assimilation of the transparent materials, and notably glass, to an interferometer.

Among the tests, some were carried out on specimens having thicknesses very close together, more exactly for thicknesses varying by 20 microns. The method according to this invention has made it possible to obtain these three values. They are shown in FIG. 6; these are the thicknesses 2.58 mm, 2.60 mm, 2.62 mm.

In order to simplify the operations during the taking of these measurements and to avoid the determining of the characteristics $\Delta\lambda$, $\lambda_0$ and n, it is possible to carry out a measurement on a specimen of known thickness and thus to calibrate the measurement apparatus.

In the control of the bottles, it is advantageous to carry out controls of thicknesses on different parts of the bottle and more particularly, at the positions of the neck, the shoulder and at various heights along the body of the bottle. Furthermore, it is preferable to perform these tests around the entire periphery of the bottle. To do this, the bottles pass continuously before several pick-ups, which may be disposed at different levels, and the bottles are given a rotary movement about their axes.

The device proposed enables a measurement by pick-up to be performed in the most demanding case every 0.3 milliseconds, which gives a measurement every millimetre around the periphery of the bottle for the usual speeds of travel and rotation along bottle production lines.

The results obtained were satisfactory for measurements taken on flat glass, coloured or non-coloured glass bottles, and on bottles of plastics material.

We claim:

1. A method of measuring a thickness of a wall of a transparent material, comprising the steps of:
   emitting a monochromatic light beam of modulated optical frequency;
   projecting the monochromatic light beam onto of the wall at a non-perpendicular angle;
   receiving two parallel light rays of said light beam which have been returned, one diffused from a first surface of said wall and a second diffused from the second surface of said wall, said two parallel light rays lying on the said side of the perpendicular to said wall as said projected light beam and forming an angle $\psi$ with said projected light beam;
   creating an interference between said two parallel light rays; and
   determining a difference of length of optical paths $\delta$ between said two interfered parallel light rays from a determination of the number of beats of the interference signal per modulation.

2. The method according to claim 1, wherein the light beam is emitted by a laser diode.

3. The method according to claim 2, wherein the optical frequency of the beam is modulated by modulating the supply current to the laser diode.

4. The method according to claim 1, wherein the modulation of the optical frequency is linear.

5. The method according to claim 1, wherein the modulation of the optical frequency is sinusoidal.

6. The method according to claim 1, wherein the material is made of one of glass and plastic, is one of clear transparent and colored transparent, and is one of coated with a skin and not coated with a skin.

7. The method according to claim 1, wherein the emitted light beam is focused onto a surface of the material.

8. The method according to claim 1, wherein said two light beams are diffused by different faces of a wall of the material.

9. The method according to claim 1, wherein the difference of length of optical paths $\delta$ is determined by the ratio of the interference signal divided by the light intensity signal.

10. The method according to claim 1, wherein $\psi$ is very small.

11. The method according to claim 10, wherein $\psi$ is approximately 5°.

12. An apparatus for measuring a thickness of a wall of a transparent material, comprising:
   a light source producing a monochromatic light beam with a modulated optical frequency and projecting said light beam onto said wall at a non-perpendicular angle;
   means for receiving two parallel light rays from said light beam which have been returned, one diffused from a first surface of said wall and a second diffused from a second surface of said wall, said means for receiving and said light source lying on the same side of a perpendicular to said wall;
   means for forming an interference signal from the two parallel light rays received from the means for receiving; and
   means for determining the number of beats of the interference signal per modulation, whereby a difference of length of optical path $\Delta$ between said parallel light rays is determined.

13. The apparatus according to claim 12, wherein the light source is a laser diode having a focusing lens.

14. The apparatus according to claim 13, wherein the laser diode is connected to a generator which provides a modulated current.

15. The apparatus according to claim 12, wherein the means for receiving includes a lens, an avalanche photodiode placed at the focus of the lens and an amplifier connected to the output of the avalanche photodiode.

16. The apparatus according to claim 15, wherein the ratio of the photosensitive diameter of the avalanche photodiode to the focal distance of the lens is small.

17. The apparatus according to claim 12, wherein the light source and the means for receiving are housed in a single casing.

* * * * *